Figure 1:
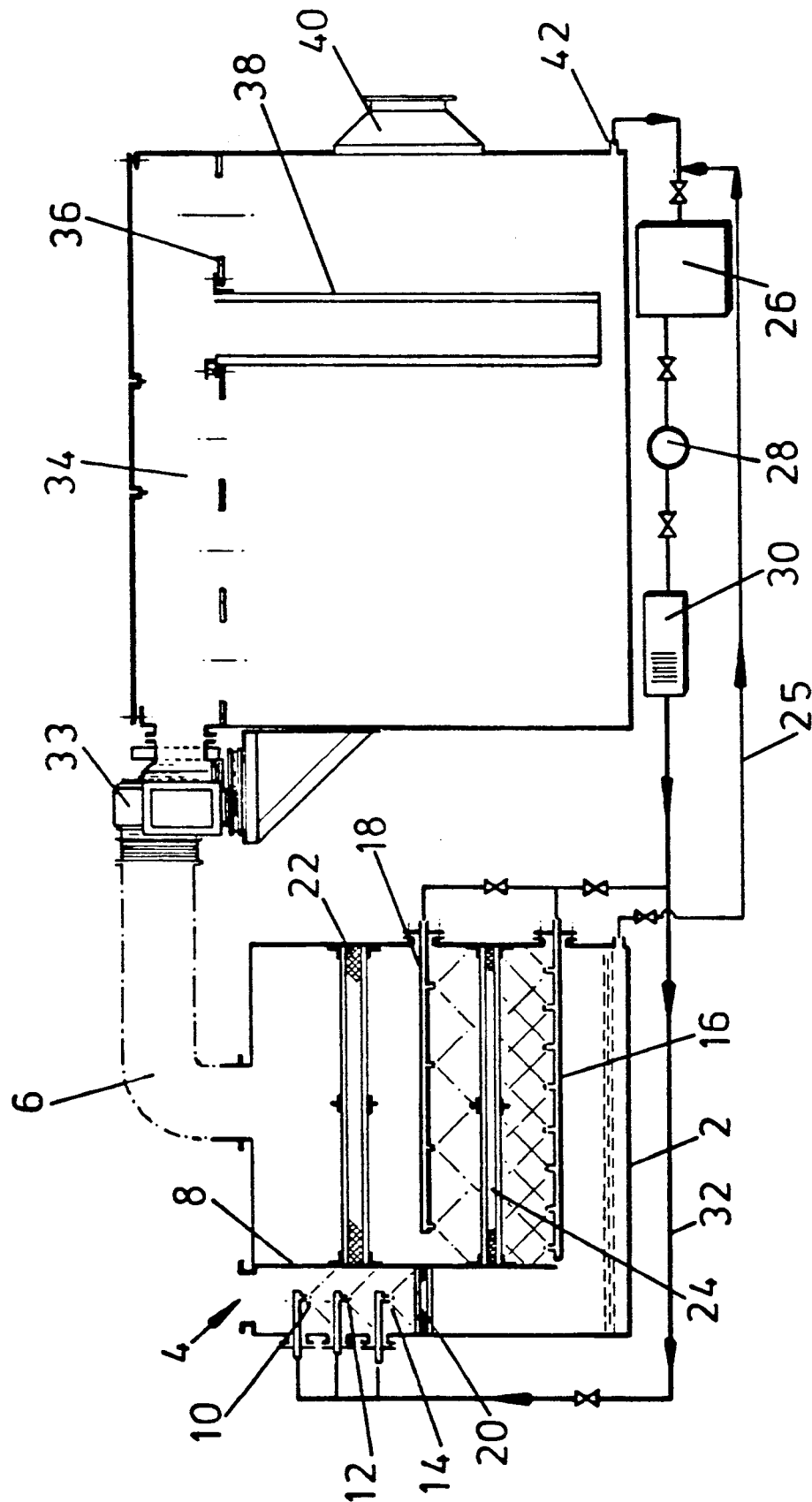

United States Patent [19]

Schumacher et al.

[11] Patent Number: 5,122,169
[45] Date of Patent: Jun. 16, 1992

[54] CHEMICAL RECOVERY SCRUBBING SYSTEM

[75] Inventors: Pierre L. J. Schumacher, Aische En Refail, Belgium; Graeme M. Cousland, Killearn, United Kingdom

[73] Assignee: Begg, Cousland & Company Limited, Glasgow, Scotland

[21] Appl. No.: 580,777

[22] Filed: Sep. 11, 1990

[30] Foreign Application Priority Data

Sep. 12, 1989 [GB] United Kingdom ............... 8920635

[51] Int. Cl.⁵ .......................................... B01D 47/00
[52] U.S. Cl. .......................... 55/228; 55/233; 55/259
[58] Field of Search ............... 55/90, 233, 259, 228

[56] References Cited

U.S. PATENT DOCUMENTS

| 3,268,296 | 8/1966 | Hall et al. | 55/259 |
| 3,450,190 | 11/1970 | Brink, Jr. | 55/259 |
| 4,084,945 | 4/1978 | Chirico | 55/90 |
| 4,251,238 | 2/1981 | Claes et al. | 55/526 |

FOREIGN PATENT DOCUMENTS 19476 2/1979 Japan ............... 55/233

Primary Examiner—Bernard Nozick
Attorney, Agent, or Firm—Krass & Young

[57] ABSTRACT

A scrubbing system for the removal of pollutant gas and liquid droplets from a gas stream prior to venting, comprises a scrubbing apparatus in which a recycled scrubbing fluid including the liquid is sprayed through the gas stream for absorption on coalescer and demister screens. Final removal of liquid droplets is achieved using candle filters of hydrophobic fibrous material.

6 Claims, 3 Drawing Sheets

CHEMICAL RECOVERY SCRUBBING SYSTEM

The present invention relates to a scrubbing system for removal of pollutant gas and usually also liquid droplets from a gas stream (usually air) by a combination of impaction, interception, agglomeration, coalescence and diffusion treatments phenomena in a particular sequence.

Regulatory authorities worldwide continue to require reduced levels of pollutant emissions from manufacturing processes. There is therefore a continuing requirement to improve the performance of antipollution systems for the treatment of effluent streams to reduce their pollutant content.

For example, in the manufacture of plastic coated materials (such as PVC coated flooring and wallcoverings) the raw materials are cured in ovens which dry off air containing a pollutant gas and liquid phases made up of volatile solvents, plasticisers, additives and other substances which must be removed before the gas stream is vented. Commonly used ways of removing the pollutants are incineration and adsorption onto activated charcoal. Incinerators and adsorbers have high capital costs and running costs and may create their own downstream air pollution. Liquid droplets present in the gas stream as mists or aerosols may be removed using diffusion filters (e.g. candle filters), which comprise beds of hydrophobic fibres. However, diffusion filters are unable to remove gaseous pollutants.

It is an object of the present invention to mitigate these problems.

The present invention provides a scrubbing system for removal of liquid droplets and pollutant gases from a gas stream which comprises:
  (i) a scrubbing apparatus for removal of pollutant gases by absorption in scrubbing fluid and impaction, interception and coalescence of scrubbing fluid droplets, which comprises:
    (a) a spray injection system for spraying scrubbing fluid in droplet form through the gas stream; recycle means for collecting and recycling the sprayed scrubbing fluid to the spray injection system;
    (b) absorption screen means formed of fibrous and/or filamentary material through which the gas stream passes having a contact surface for receiving scrubbing fluid and assisting absorption of pollutant gas into the scrubbing fluid, and for impaction, interception and coalescence of liquid droplets of scrubbing fluid thereon; and
  (ii) diffusion filter means downstream of the scrubbing device for removal of residual liquid droplets from the gas stream from the scrubbing apparatus.

The invention also provides a corresponding method.

Usually, the invention involves the use of recovered liquid (or a scrubbing fluid usually containing the recovered liquid as a major proportion) as the scrubbing fluid.

The absorption screen means usually includes one or more beds of fibrous coalescing material and/or one or more beds of demisting material, which act as a contact surface for the absorption of pollutant gas into the scrubbing fluid, and also allow for removal of liquid droplets from the gas stream by impaction of droplets onto the surface, by interception and by diffusion effects. Typically, coalescers are intended for removal of droplets of less than 5 microns diameter (e.g. 2-5 microns) and may comprise a pad of a composite fabric consisting partly of monofilaments and partly of a staple fibre yarn exhibiting along its length the ends of the staple fibres composing it. Demisters are intended for removal of droplets greater than 5 microns in diameter and typically comprise multiple layers of mesh or fabric knitted from metal or plastic monofilaments, crimped and assembled so that the crimps cross in successive layers. Demister pads made in this way have a very uniform voidage and a high ratio of filament surface area per unit volume of pad.

To assist build up of scrubbing fluid on the absorption screen means, scrubbing fluid may be sprayed directly onto the absorption screens.

It is also possible to employ a packed tower to provide a contact surface for absorption of pollutant gas into the scrubbing fluid.

Since the absorption of the mist of liquid droplets into the scrubbing fluid is often an exothermic process, a cooler or chiller may be provided in the recycle circuit to cool the fluid to a temperature low enough to allow scrubbing to occur. The diffusion filter is preferably composed of a plurality of cylindrical filters of hydrophobic fibrous material (e.g. candle filters). Diffusion filters are well known and generally comprises a fibre bed formed of fibres (e.g. glass fibres) treated to have a hydrophobic surface. Droplets are removed by a combination of impingement for droplets less than 1 to 2 microns diameter and diffusion for finer droplets where Brownian motion becomes increasingly predominant. Typical candle filters comprise a packed annular sleeve of thickness 5-20 cm. Preferably, the density of the fibre bed is greater than 0.15 kg/m$^3$. For maximum efficiency, two fibre beds may be arranged in series; or a double filter comprising two spaced annular sleeves having an annular gap between may be used.

The candle filters may be standing (i.e. with an inlet at the lower end of the sleeve) but are preferably hanging with a gas inlet at the upper end of the sleeve.

Preferably, a fan is interposed between the scrubbing apparatus and the filter device, and this further assists agglomeration of the droplets and decreases the vapour pressure of the pollutants.

The recovered liquid may be recycled to the production process, or removed for other use, and is often a volatile liquid.

The scrubbing system has wide application, including removal of sulphur oxides and nitrogen oxides, volatile chemicals, and emissions of solvents and process chemicals used in manufacture of paper, petroleum products, siderurgy and metallurgy. The scrubbing fluid is preferably chosen to be directly reusable in the production process.

Figure 2:
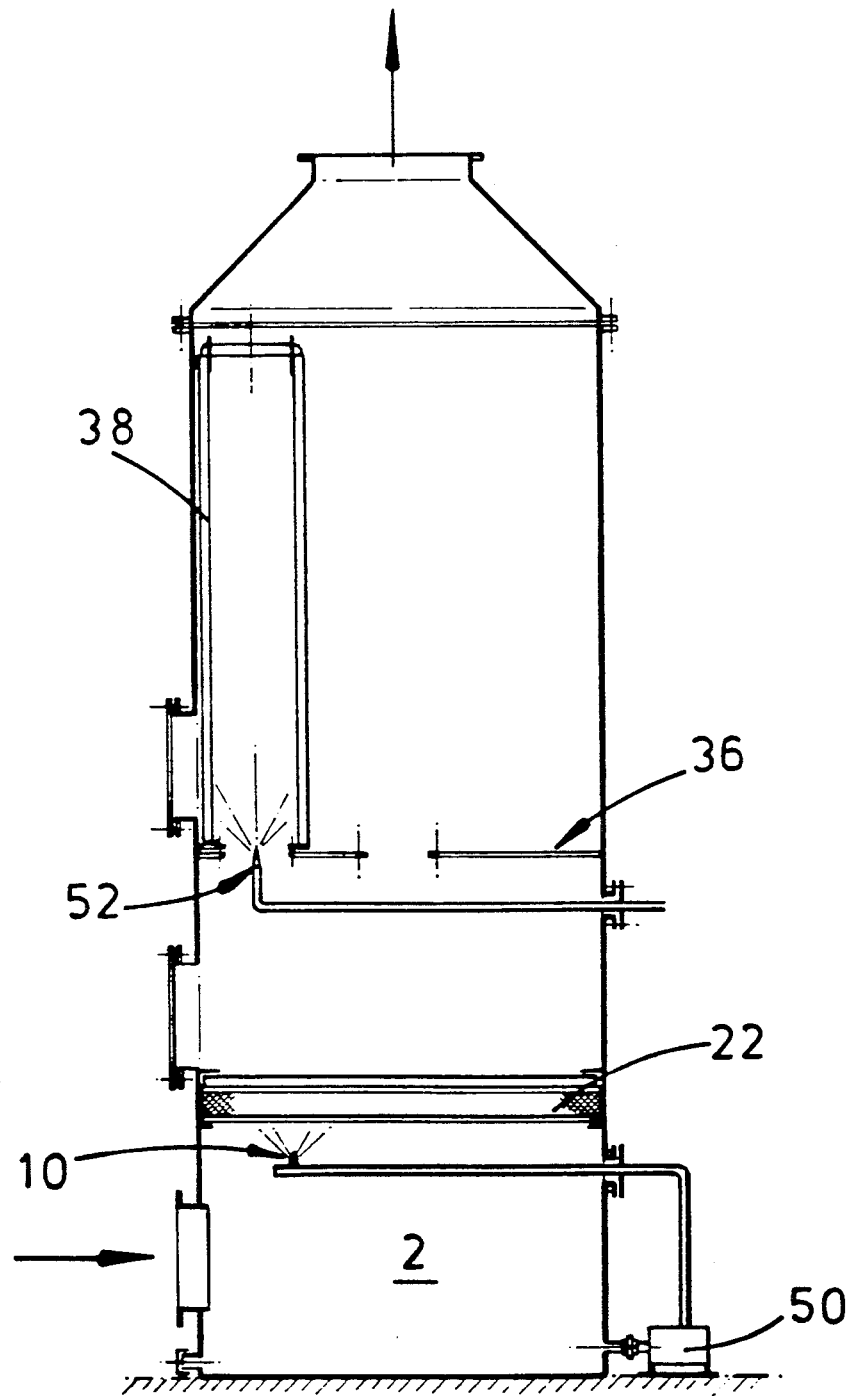
Figure 3:
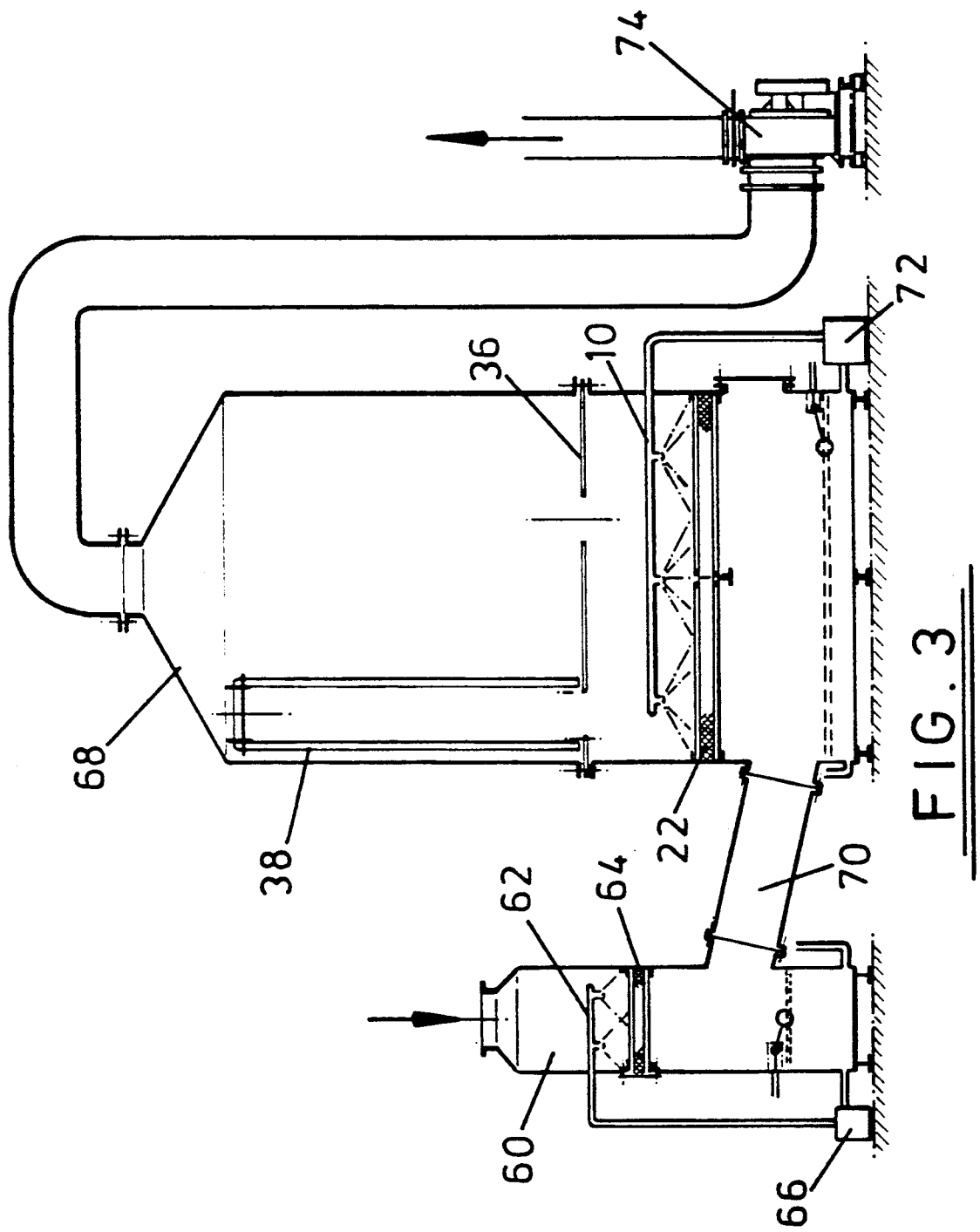

An embodiment of the present invention will now be described by way of example only with reference to the accompanying drawing wherein FIG. 1 is a schematic sectional elevation of an impaction coalescer scrubbing apparatus and a diffusion interception filter assembly with agglomerating fan;

FIG. 2 is a schematic sectional elevation of a second embodiment with the diffusion filter above the scrubbing apparatus; and FIG. 3 is a schematic sectional elevation of a third embodiment.

In the figures the same reference numerals are used to indicate analogous parts.

The scrubbing apparatus comprises a rectangular chamber 2 having an inlet 4 for a gas stream and an outlet 6 for scrubbed gas. A baffle 8 extends downwards from an upper end of the chamber to define a U-shaped gas flow path.

Three banks 10, 12, 14 of spray nozzles are arranged near the inlet 4. Two further banks 16, 18 of nozzles are also mounted in the chamber. The number of banks of spray nozzles can be varied according to the space available, ease of absorption and pumping pressures of scrubbing fluid. Demister impaction screens 20, 22 (e.g. a pad formed of crimped layers of knitted metal or plastic monofilaments, and available from Begg, Cousland & Co. Ltd. under the trademark BECOIL) for removal of particles greater than 5 microns diameter; and coalescer screen 24 (e.g. a pad formed of a composite fabric and available from Begg, Cousland & Co. Ltd. under the trademark BECONE) for removal of 2-5 micron droplets are mounted across the gas flow path. Scrubbing fluid collects in the bottom of the chamber and is recycled via line 25, tank 26, pump 28, cooler 30 and line 32 to the spray nozzles. Part of the fluid is periodically withdrawn and replaced with fresh fluid to prevent undue build-up of pollutants.

The scrubbed gas is transported by fan 33 into a diffusion filter assembly 34 comprising a perforate plate 36 supporting an array of twenty cylindrical diffusion filters 38 ("candle filters"—only one shown) of hydrophobic fibrous material available from Begg, Cousland & Co. Ltd. under the trademark BECOFIL. Filtered gas exits from filter outlet 40. Recovered liquid is collected in the bottom of the filter assembly and passes through liquid outlet 42 to the scrubbing fluid tank 26 for recycling.

The cross sectional area and height of the scrubbing chamber 2, together with the type, density and surface area of the packing can be varied as operating conditions require, for example to achieve high velocity and/or high pressure loss or alternatively low velocity and/or low pressure loss conditions. The chamber 2 may be square, rectangular or round in cross-section. The invention is not limited to a downwards then upwards flow of gas through the scrubbing chamber.

EXAMPLE 1

An experiment was conducted to remove plasticiser, additives and solvent from the exhaust gas of a curing oven in a process for manufacturing polyvinylchloride coated floor covering, using the apparatus shown in FIG. 1. The scrubbing liquid was solvent containing plasticiser comprising benzylbutylphthalate (BBP), diisononylphthalate (DINP), diisobutylphthalate (DIBP) and 2,2,4-trimethyl-1,3-diisobyrate (TXIB). The gas throughput was 250 m$^3$/h at an inlet temperature of 98° C. and cleaned gas outlet temperature of 21° C. The temperature of the scrubbing liquid was 5°-10° C. The organic contents of the gas was measured as total carbon content using a flame ionisation detector (FID). TXIB content was measured as TXIB and as carbon content. The results are shown in Table 1.

The total carbon of the dirty gas stream was about 4000 mg/m$^3$. After the scrubber stage this was reduced to about 100-150 mg/m$^3$; and down to about 50 mg/m$^3$ at the outlet. This compared favourably with a level of only about 500 mg/m$^3$ achieved by existing diffusion filters and downstream antipollution devices.

The results show that the total carbon content was reduced overall by 95% and the TXIB content reduced by 96%.

TABLE 1

|  | Dirty Gas | Cleaned Gas |
|---|---|---|
| Total Carbon FID method | 3000-4700 | 40-60 |
| TXIB |  |  |
| as TXIB | 3060-6110 | 41-120 |
| as carbon | 2050-4090 | 27-80 |

EXAMPLE 2

Further tests were carried out on the cleaning of gas stream containing gas and liquid pollutants as described in Example 1.

Scrubbing apparatus as described in conjunction with FIG. 1 was employed with the following modifications. Firstly, the demister screen 20 was replaced by a packed tower. Secondly, candle filters 38 were of a double construction comprising inner and outer packed fibre sleeves spaced by an annular gap, so as to provide an arrangement effectively comprising two candle filters in series.

The results are given in Table 2.

The product names refer to brands of floor covering and the total carbon was measured using a flame ionisation detector. The units are mg per normal cubic meter of gas. The results demonstrate extremely effective removal of pollutants from the gas stream.

TABLE 2

ANALYSIS OF GAS FROM A PILOT PLANT (mg/N m$^3$ total carbon)

| Run No. | Product (code) | Dirty Gas mg/N.m$^3$ | Cleaned Gas mg/N.m$^3$ |
|---|---|---|---|
| 1 | Balastar 3000 (3M) | 3500 | 144 |
| 2 | D3 Optima | 4320 | 24 |
| 3 | Balastar 1300 (3J) | 800 | 8.80 |
| 4 | Quadro Comet (3Q) | 608 | 7.68 |
| 5 | Balastar 3000 (3M) | 4800 | 14.4 |
| 6 | Balastar 1200 (3F) | 3520 | 19.2 |
| 7 | Balastar 1300 (3J) | 8000 | 19.2 |
| 8 | Balastar 2000 (ST98) | 2400 | 16.0 |

FIG. 2 shows a second embodiment for scrubbing ammonium chloride fume from exhaust gas using recirculating ammonia as scrubbing fluid, wherein the scrubbing chamber 2 is below the candle filters 38 (only one shown) which are of the standing type.

Scrubbing fluid is recirculated from the base of the scrubbing chamber by pump 50 to spray nozzles 10, which are directed onto a demister screen 22 formed of polymer fibre between top and bottom support grids.

The candle filters are mounted over apertures in perforate plate 34. A subsidiary spray 52 is directed onto the inside of the candle filter to keep it wet and prevent solidification of material thereon.

FIG. 3 shows a third embodiment which comprises a first vessel 60 containing a spray nozzle 62, demister 64 and recirculating pump 66. Gas flows vertically down the vessel and exits into the second vessel 68 via duct 70. In the second vessel gas passes upwards through demister screen 22 onto which scrubbing fluid is sprayed by spray nozzles 10 by recirculating pump 72.

The diffusion filter comprises standing candles 38 (only one shown) supported over apertures in plate 36. Dirty gas is drawn through the system by pump 74 located in the clean gas stream.

We claim:

1. A scrubbing system for removal of liquid droplets and pollutant gases from a gas stream, the scrubbing system comprising a housing having an inlet for said polluted gas stream and an outlet for scrubbed gas, said housing defining a gas flow path for said gas stream through the scrubbing system, said gas flow path passing from said inlet to said outlet, a scrubbing apparatus and a diffusion filter means being located within the housing and sequentially in the direction of the gas flow path:

(i) the scrubbing apparatus operative to remove pollutant gases by absorption in scrubbing liquid and for impaction, interception and coalescence of scrubbing liquid droplets, and comprising:

(a) a spray injection system for spraying scrubbing liquid in droplet form through the gas stream; recycle means for collection the sprayed scrubbing liquid from the housing and recycling the collected liquid to the spray injection system;

(b) absorption screen means formed of a material selected from fibrous material, filamentary material and mixtures thereof through which the gas stream passes, the absorption screen means being disposed across the housing means and downstream of the spray injection system in said gas flow path direction, and having a contact surface for receiving scrubbing liquid and assisting absorption of pollutant gas into the scrubbing liquid, and for impaction, interception and coalescence of droplets of scrubbing liquid thereon; said housing further configured so that the gas stream passes through said gas flow path in an upwards direction through the absorption screen means; and the scrubbing liquid droplets from said spray injection system being sprayed onto the absorption screen means; and (ii) the diffusion filter means being located within said housing and downstream of the scrubbing apparatus so that the gas stream passes therethrough after it leaves the scrubbing apparatus, said diffusion filter means operative to remove residual liquid droplets from the gas stream after it leaves the scrubbing apparatus; and the recycle means also collecting said removed residual liquid and recycling the removed residual liquid to the spray injection system; the scrubbing system further comprising cooling means connected into the recycle means for cooling the liquid collected from the spray injection system and also collected from the diffusion filter means prior to the cooled collected liquid being recycled to the spray injection system once more.

2. A system according to claim 1 in which a housing means comprises a first housing having the scrubbing apparatus disposed therein and a second housing connected to the first housing and having the diffusion filter means disposed therein, said system further including a fan interposed between the scrubbing apparatus and the diffusion filter means for assisting agglomeration of droplets carried over in the gas stream from the scrubbing apparatus.

3. A system according to claim 1 wherein the absorption screen means comprises a fibrous coalescer screen for substantial removal of droplets of 2 to 5 microns diameter.

4. A system according to claim 1 wherein the absorption screen means comprises a demister screen formed of crimped knitted fabric produced from monofilamentary material for substantial removal of droplets of greater than 5 microns diameter.

5. A system according to claim 1 wherein the diffusion filter means comprises a plurality of candle filters, each composed of a sleeve of packed hydrophobic fibres for substantial removal of particles less than 2 microns diameter.

6. A system according to claim 5 wherein the hydrophobic fibres are packed to a density greater than 0.15 $kg/m^3$.

* * * * *